United States Patent [19]

Bridger et al.

[11] Patent Number: 5,011,796
[45] Date of Patent: Apr. 30, 1991

[54] SOL-GEL PREPARATION OF POLYCRYSTALLINE STRONTIUM BARIUM NIOBATE (SBN)

[75] Inventors: Keith Bridger, Washington, D.C.; Lorianne Jones, Cockeysville; Stephen R. Winzer, Ellicott City, both of Md.

[73] Assignee: Martin Marietta Corporation, Bethesda, Md.

[21] Appl. No.: 425,666

[22] Filed: Oct. 23, 1989

[51] Int. Cl.$^5$ .................................................. C03C 3/00
[52] U.S. Cl. ..................................... 501/12; 501/135; 505/735; 252/315.01; 252/315.1
[58] Field of Search ................................ 501/12, 135; 252/315.01, 315.1, 62.9; 505/375

[56] References Cited

U.S. PATENT DOCUMENTS

| 2,961,327 | 11/1960 | Goodman | 501/135 |
| 4,131,479 | 12/1978 | Ichinose et al. | 501/135 |
| 4,543,341 | 9/1985 | Barringer et al. | 501/135 |
| 4,585,745 | 4/1986 | Tunooka et al. | 501/135 |
| 4,801,318 | 1/1989 | Toki et al. | 501/12 |
| 4,816,072 | 3/1989 | Harley et al. | 501/12 |

OTHER PUBLICATIONS 1,113, 08181988, Wu et al.

Primary Examiner—William R. Dixon, Jr.
Assistant Examiner—Sue Hollenbeck
Attorney, Agent, or Firm—Herbert W. Mylius; Alan G. Towner; Gay Chin

[57] ABSTRACT

A sol-gel method is disclosed for the production of polycrystalline strontium barium niobate (SBN) materials. Ceramic SBN materials produced in accordance with this method possess favorable ferroelectric properties, and are useful for electro-optic applications.

40 Claims, 2 Drawing Sheets

SOL-GEL PREPARATION OF POLYCRYSTALLINE STRONTIUM BARIUM NIOBATE (SBN)

FIELD OF THE INVENTION

This invention relates to a new sol-gel process for the preparation of polycrystalline strontium barium niobate (SBN) materials. These SBN materials possess favorable ferroelectric properties, and are useful for electro-optic applications such as optical shutters, modulators, switches, filters, actuators, displays, linear gate arrays, image storage, and phase conjugation.

BACKGROUND OF THE INVENTION

The existence of the ferroelectric compound $Sr_xBa_{1-x}Nb_2O_6$ was first reported in 1960 see M. H. Francombe, Acta Crystallography 13, 131 (1960)]. The composition was found to fall within the range $0.20 < X < 0.70$, and was said to be closely related in structure to the tetragonal tungsten bronze structure. In the mid 1960's, the first $Sr_xBa_{1-x}Nb_2O_6$ single crystals were grown over a range of compositions $0.25 < X < 0.75$ [see A. A. Ballman and H. Brown, Journal of Crystal Growth 1, 311 (1966)]. These single crystals were found to possess large electro-optic coefficients, indicating their potential use in laser modulation and deflection devices. The favorable electrical properties of these single crystals has also led to their use in pyroelectric detection devices.

The vast majority of work in the SBN area has centered around the production of single crystal materials. These crystals are formed by a conventional technique, known as the Czochralski method, which involves growing the crystals from a molten bath containing the SBN constituents. U.S. Pat. No. 4,001,127 to Megumi et al describes such a process for making single crystal SBN, whereby a melt containing strontium oxide, barium oxide and niobium pentoxide is prepared, and a seed crystal is used to grow a single crystal of SBN from the melt. Megumi et al control the amounts of strontium oxide, barium oxide and niobium pentoxide present within the melt in order to obtain high quality SBN single crystals having improved homogeneity.

U.S. Pat. No. 4,187,109, to Megumi et al, relates to single crystal SBN which is doped with a transition metal such as cerium, vanadium or uranium. The single crystals are grown using the Czochralski method, and are said to be capable of photo-induced refractive index changes.

Studies have shown that single crystal $Sr_{0.75}Ba_{0.25}Nb_2O_6$ (SBN 75) possesses superior optical sensitivity, which allows for its use as a holographic storage medium (see J. B. Thaxter and M. Kestigan, Applied Optics, Vol. 13, No. 4, pp. 913-924, 1974). Studies have also shown that single crystal $Sr_{0.60}Ba_{0.40}Nb_2O_6$ (SBN 60) is suitable for use as a substrate material in the growth of thin films by the liquid phase epitaxial technique (see R. R. Neurgaonkar and E. T. Wu, Materials Research Bulletin, Vol. 22, pp. 1095-1102, 1987).

However, several difficulties are associated with the growth of single crystals, including the inability to grow large crystals, and the lack of homogeneity. Crystal sizes are typically limited in diameter to 2 or 3 centimeters, while "striation" along the growth axis and "core", normal to the growth axis, cause inhomogeneity. Additionally, the cost of growing single crystals is high.

Polycrystalline (ceramic) materials have a number of advantages over single crystal materials. They may be formed in virtually any size or shape, whereas single crystals are limited by crystallographic orientation and growth conditions. Ceramic materials, and in particular ferroelectric ceramics, are typically formed by the mixed oxide technique, which involves mixing oxide starting powders and forming the mixture into the desired shape, by such methods as pressing, sintering, and hot isostatic pressing (HIPing). Ceramics such as $Al_2O_3$-MgO, $Y_2O_3$-$ThO_2$, and $Pb_{1-3x/2}La_xZr_{1-y}Ti_yO_3$ (PLZT) have been made by the mixed oxide technique.

U.S. Pat. No. 4,019,915, to Miyauchi et al, relates to a mixed oxide method for making ferroelectric ceramic materials of the composition $ABO_3$, wherein A includes Pb and at least one of the elements Ba and Sr, and B includes Zr or a combination of Zr and Ti.

Polycrystalline SBN has been produced by the mixed oxide method. Carruthers et al describe the phase equilibria relations in polycrystalline SBN produced by the mixed oxide technique (see J. R. Carruthers and M. Grasso, Journal of the Electrochemical Society: SOLID STATE SCIENCE, Vol. 117, No. 11, pp. 1426-1430, 1970). The method of preparation taught by Carruthers et al requires the use of high temperatures, on the order of 1400° C. and higher, which are typical of the mixed oxide method.

In recent years, an alternative method known as sol-gel processing has been used to make ceramic materials. The sol-gel process begins with chemical precursors which may either be a solution or a colloidal dispersion (sol) of extremely fine particles. Chemical reactions, which cause polymerization in the continuous phase, are then initiated and the liquid sets to a rigid gel. The gel is then dried and fired to form a polycrystalline body. The sol-gel technique has been used to form a limited number of ceramics, including glasses, silica, and thin films. However, it is believed that the sol-gel method has not heretofore been used successfully to form SBN materials.

SUMMARY OF THE INVENTION

An object of the present invention is to provide a new sol-gel method for the production of polycrystalline SBN materials.

DETAILED DESCRIPTION OF THE INVENTION

Figure 1:
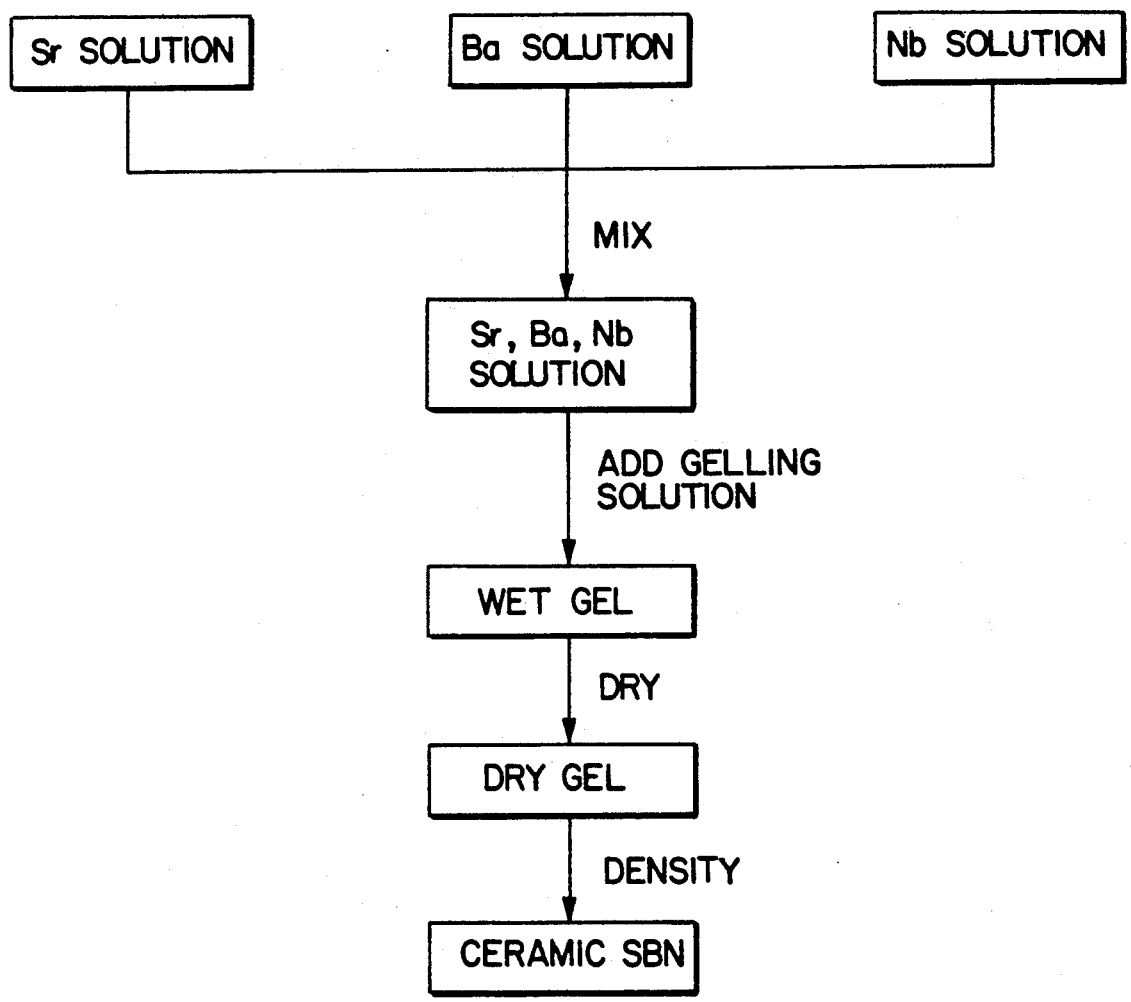
FIG. 1 is a flow diagram illustrating the sol-gel method of the present invention.

The present invention relates to the production of polycrystalline strontium barium niobate materials. The materials are of the general formula $Sr_xBa_{1-x}Nb_2O_6$, where x may range from about 0.20 to about 0.80. Preferably, x may range from about 0.50 to about 0.75. Preferred compositions of the present invention have values of x corresponding to 0.50, 0.60, and 0.75. Ferroelectric properties are maximized in compositions near the morphotropic phase boundary, i.e. for values of x near 0.75. However, useful materials may also be produced at lower Sr levels. For ease of reference, the compositions produced in accordance with the present invention will be referred to by the nomenclature "SBN X", where X represents the percentage of Sr present in relation to the total amount of Sr and Ba. Thus, for example, a composition of the formula $Sr_{0.75}Ba_{0.25}Nb_2O_6$ will be designated as "SBN 75".

The sol-gel method of the present invention involves the basic steps of (1) forming a solution comprising Sr, Ba, and Nb alkoxides in an alcoholic solvent, (2) gelling the solution, (3) drying the gel, and (4) densifying. The alcoholic solution of Sr, Ba, and Nb alkoxides is preferably formed by mixing separate solutions containing alkoxides of the individual metals. Thus, separate mixtures, each comprising an alkoxide of one of the metals Sr, Ba, and Nb in an alcoholic solvent, may be combined to form the solution of Sr, Ba, and Nb alkoxides. Methoxyethanol is the preferred alcoholic solvent for each of the individual Sr, Ba, and Nb alkoxide containing solutions. However, the metals may be dissolved in other alcohols, e.g. primary, secondary, and/or tertiary alcohols, including pentanol, ethanol, and methanol. The alcohol used in forming the alkoxide solutions may be the same or different for each of Sr, Ba, and Nb. After mixing the solutions, the mixture is brought to equilibrium at the desired temperature. Temperature control is important since the subsequent gelation reaction proceeds too rapidly at too high a temperature, resulting in an inhomogeneous gel. Generally, relatively low temperatures in the range of from about −30 to about 25° C. are suitable.

Gelling of the Sr, Ba, and Nb containing solution is achieved by mixing the solution with a gelling solution comprising an alcohol-water mixture. While the alcohol is preferably methoxyethanol, other alcohols may be substituted, such as pentanol, ethanol, and methanol. The alcohol in the gelling solution may be the same as, or different than, the alcohol used in the Sr, Ba, and Nb alkoxide containing solutions. The water is preferably deionized. Various ratios of alcohol to water may be used in the gelling solution, with the constraint that enough water must be present to effect the gellation process. A preferred ratio is 70 parts methoxyethanol to 30 parts deionized water. The ratio of the gelling solution to the Sr, Ba, and Nb containing solution may also be varied to adjust the cohesive strength of the gel. The temperature during the gelling process should be maintained between about −30 and about 25° C. After mixing of the gelling solution with the Sr, Ba, and Nb containing solution, the reactants are cast and allowed to gel. The mixture may be cast into a container such as a shallow dish, or the mixture may be cast onto a second, immiscible liquid. Casting onto an immiscible liquid has the advantage that stresses which may occur at the interface of the gel and a solid container caused by shrinkage of the gel are alleviated. Thus, cracking during drying of the gel may be reduced. However, care must be taken that the immiscible liquid does not diffuse into the gel, or otherwise adversely affect the gel.

Drying of the gel may be accomplished over a period of time ranging from 1 day to several months. Although short drying times are generally preferred, too rapid a drying rate can result in cracking of the gel. Preferred drying times range from about 2 days to about 21 days. Drying temperatures are relatively low, ranging from about 1 to about 25° C. Normal refrigeration temperatures of from about 1 to about 5° C. may be used effectively, as well as room temperatures of from about 20 to about 25° C. Multiple drying temperatures may also be used. For example, the gel may first be partially dryed under refrigeration at about 3° C., and may thereafter be fully dried at room temperature. During drying, the gel may be sealed from the atmosphere, may be exposed to the atmosphere, or a combination of both.

Densification of the dried gel may be accomplished in several ways. The dried gel may be directly densified through such methods as sintering, hot pressing, hot isostatic pressing, or a combination thereof. Alternatively, the dried gel may be calcined, followed by a consolidation process, such as pressing, sintering, and/or hot isostatic pressing. When a calcining step is used, temperatures ranging from about 1050 to about 1250° C. may be utilized, with a temperature of about 1150° C. being preferred. Calcining times may range from about 1 to about 3 hours, with about 2 hours being preferred. The dried gel may optionally be ground prior to calcining. When a hot pressing step is used, temperatures ranging from about 1300 to about 1400° C., and pressures ranging from about 2000 to about 3500 psi are preferred. Sintering may be achieved at temperatures ranging from about 1250 to about 1480° C., with a temperature of about 1300° C. being preferred. Sintering times of about 2 to about 4 hours are satisfactory, with about 3 hours being preferred. When a hot isostatic pressing step is employed, temperatures ranging from about 1200 to about 1350° C. may be used, while pressures of from about 20,000 to about 35,000 psi, with a hold time of from about 1 to about 4 hours, are suitable. It is generally desired to maximize the density of the SBN materials produced in accordance with the present invention. Densities of greater than about 99 percent of theoretical are preferred, with densities of greater than about 99.5 percent being the most preferred.

In accordance with the present invention, a preferred method for densification includes the steps of calcining, followed by pressing, sintering, and, optionally, hot isostatic pressing. For example, a dried gel may be calcined at 1150° C. for 2 hours, pressed at a pressure of 2000 psi, and sintered at 1300° C. for 3 hours. The resultant product may then be hot isostatically pressed at a temperature of 1350° C. and at a pressure of 27,000 psi, with a 3 hour hold time.

FIG. 1 is a flow chart illustrating the general sol-gel processing steps of the present invention, as discussed above, through the steps of mixing, gelling, drying, and densifying.

The polycrystalline SBN materials of the present invention exhibit favorable ferroelectric properties. The materials possess dielectric constants ranging from about 1000 to about 6000, and above, for temperatures ranging from −50 to 150° C. Curie temperatures range from about 25° C. to about 95° C. for a frequency of 1 kHz. Loss tangents of the present materials may range from about 0.05 to about 0.15 at 0° C., and may range from about 0.001 to about 0.15 at 50° C., depending upon frequency and temperature.

The following examples illustrate various aspects of the sol-gel method of present invention. The examples are not meant to limit the scope of the invention.

EXAMPLE 1

Figure 2:
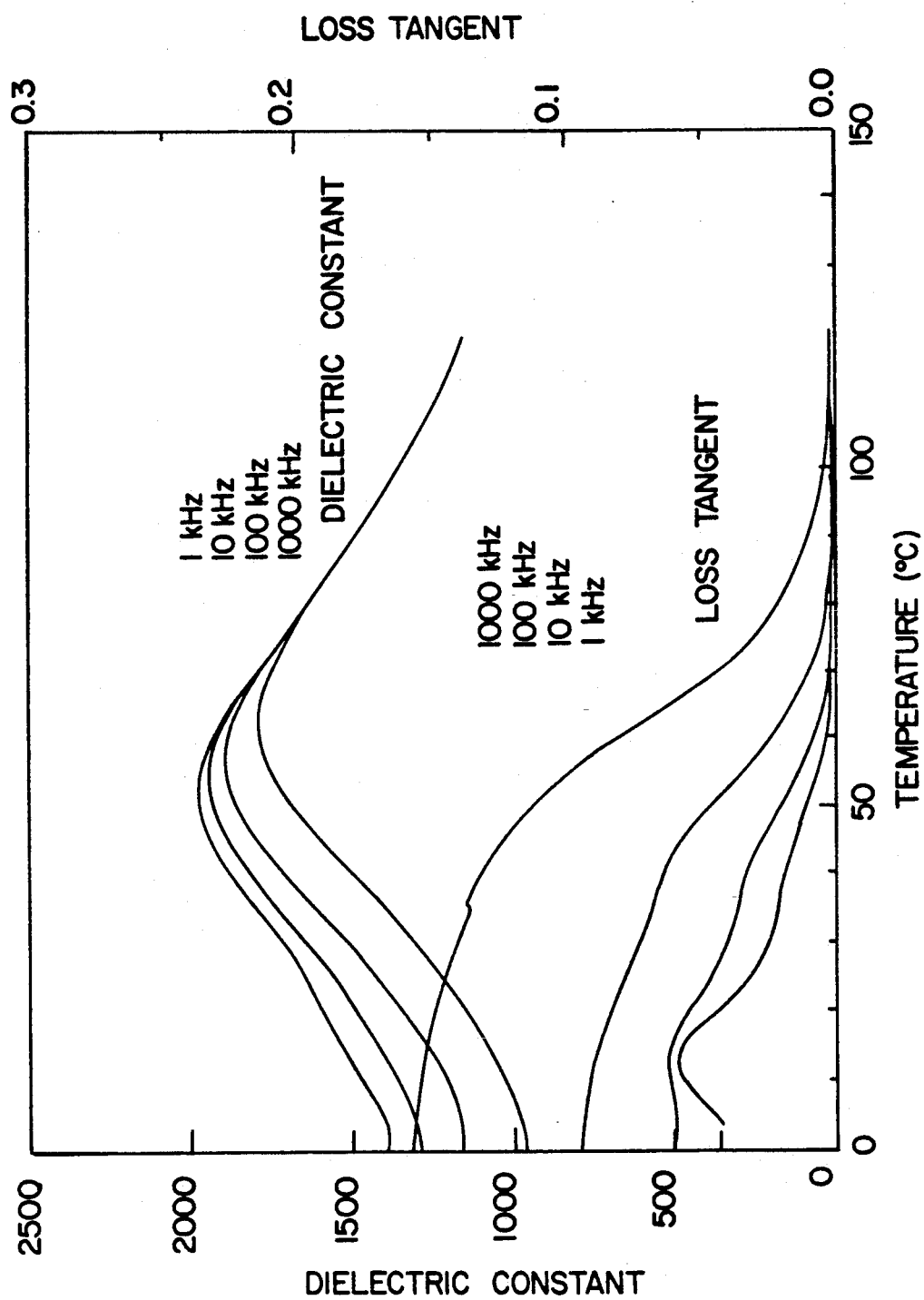
FIG. 2 is a graph illustrating dielectric constant and loss tangent versus temperature for a polycrystalline SBN material produced in accordance with the present invention.

A polycrystalline SBN 75 material is produced in the following manner. A strontium solution is prepared by slowly adding 5 grams of Sr, having a purity of 99 percent, to 50 grams of methoxyethanol under an inert argon atmosphere. The mixture is stirred until the Sr is completely dissolved. A barium solution is prepared by slowly adding 5 grams of Ba, having a purity of 99.7 percent, to 50 grams of methoxyethanol under an inert argon atmosphere, and stirring the mixture until the Ba is completely dissolved. A niobium solution is prepared by mixing together 50 grams of niobium ethoxide, having a purity of 99.999 percent, with 50 grams of methoxyethanol under an inert argon atmosphere. A gelling solution is prepared by mixing together 70 ml methoxyethanol and 30 ml deionized water. The methoxyethanol used in each of these solutions is of high purity and is anhydrous, having a water content of less than 0.005 percent. A mixture of 4.73 grams of the strontium solution, 2.47 grams of the barium solution, and 8.33 grams of the niobium solution is formed in a container and brought to an equilibrium temperature of $-10°$ C. by placing the container in a dry ice/acetone bath. After the mixture reaches equilibrium, 2.30 grams of the gelling solution are added to the mixture and stirred. This solution is poured into a glass petri dish which is then placed uncovered in a refrigerator at $3°$ C. and allowed to gel for 6 hours. The dish is then covered and the gel is maintained at $3°$ C. for 2 weeks. The partially dried gel is then removed from the refrigerator and held at room temperature for 2 days while still remaining covered. The cover is then removed and the gel is allowed to completely dry for 2 days. The dried gel is then calcined at $1150°$ C. for 2 hours, pressed, and sintered at $1330°$ C. for 3 hours. The sintered SBN 75 product thus obtained contains substantially 100 percent tungsten bronze phase SBN, as verified by x-ray defraction. Dielectric constant and loss tangent measurements are made on this SBN 75 material. The results are shown in FIG. 2, which graphs dielectric constant and loss tangent versus temperature for different frequencies.

EXAMPLE 2

Example 1 is repeated, except that the amounts of Sr and Ba present in the starting solutions are adjusted to produce an SBN 60 material. The resultant polycrystalline SBN 60 material contains substantially 100 percent tungsten bronze phase SBN, and exhibits favorable dielectric constant and loss tangent values.

EXAMPLE 3

Example 1 is repeated, except that the amounts of Sr and Ba present in the starting solutions are adjusted to produce an SBN 50 material. The resultant polycrystalline SBN 50 material contains substantially 100 percent tungsten bronze phase SBN, and exhibits favorable dielectric constant and loss tangent values.

EXAMPLE 4

A sintered SBN 50 body produced as in Example 3 is further hot isostatically pressed. The resultant product is found to contain substantially 100 percent tungsten bronze phase SBN, and to have favorable dielectric constant and loss tangent values.

It is to be understood that the above description of the present invention is susceptible to various modifications, changes, and adaptations by those skilled in the art, and that the same are to be considered to be within the spirit and scope of the invention as set forth by the following claims.

We claim:

1. A method for the production of polycrystalline strontium barium niobate materials having a substantially 100 percent tungsten bronze structure, the method comprising forming a solution of Sr, Ba and Nb alkoxides in an alcoholic solvent, gelling the solution, drying the gelled solution, and densifying the dried gel.

2. A method as set forth in claim 1 wherein the solution of Sr, Ba, and Nb alkoxides is formed by mixing together individual solutions, each comprising an alkoxide of one of the elements Sr, Ba, and Nb in an alcoholic solvent.

3. A method as set forth in claim 1 wherein the alcoholic solvent comprises methoxyethanol.

4. A method as set forth in claim 1 wherein the solution of Sr, Ba, and Nb alkoxides is maintained at a temperature ranging from about $-30$ to about $25°$ C. prior to gelling.

5. A method as set forth in claim 1 wherein gelling of the solution of Sr, Ba, and Nb alkoxides is accomplished by mixing said solution with a gelling solution comprising a mixture of alcohol and water.

6. A method as set forth in claim 5 wherein the gelling solution comprises a mixture of methoxyethanol and deionized water.

7. A method as set forth in claim 1 wherein gelling of the solution is carried out at a temperature ranging from about $-30$ to about $25°$ C.

8. A method as set forth in claim 1 wherein drying of the gelled solution is carried out at temperatures ranging from about 1 to about $25°$ C.

9. A method as set forth in claim 1 wherein drying of the gelled solution is carried out over a period of time ranging from about 2 to about 21 days.

10. A method as set forth in claim 1 wherein densifying of the dried gel is accomplished by calcining the dried gel, followed by pressing and sintering.

11. A method as set forth in claim 10 wherein the dried gel is ground prior to calcining.

12. A method as set forth in claim 10 wherein calcining is carried out at a temperature ranging from about 1050 to about $1250°$ C., and for a time ranging from about 1 to about 3 hours.

13. A method as set forth in claim 10 wherein sintering is carried out at a temperature ranging from about 1250 to about $1480°$ C., and for a time ranging from about 2 to about 4 hours.

14. A method as set forth in claim 10 wherein densifying of the dried gel further includes hot isostatic pressing following sintering.

15. A method as set forth in claim 1 wherein the polycrystalline strontium barium niobate material is of the formula $Sr_xBa_{1-x}Nb_2O_6$, where x ranges from about 0.20 to about 0.80.

16. A method as set forth in claim 15 wherein x is about 0.50.

17. A method as set forth in claim 15 wherein x is about 0.60.

18. A method as set forth in claim 15 wherein x is about 0.75.

19. A method as set forth in claim 1 wherein the polycrystalline strontium barium niobate material has a dielectric constant ranging from about 1000 to about 6000 for temperatures ranging from $-50$ to $150°$ C.

20. A method as set forth in claim 1 wherein the polycrystalline strontium barium niobate material has a Curie temperature ranging from about 25 to about $95°$ C. for a frequency of 1 kHz.

21. A method for the production of polycrystalline strontium barium niobate materials having a substantially 100 percent tungsten bronze structure, the method comprising the steps of:

a. forming a solution of Sr, Ba and Nb alkoxides in an alcoholic solvent;
b. mixing the solution of Sr, Ba and Nb alkoxides with a gelling solution comprising a mixture of alcohol and water to form a gel;
c. drying the gel; and
d. densifying the dried gel.

22. A method as set forth in claim 21 wherein the solution of Sr, Ba, and Nb alkoxides is formed by mixing together individual solutions, each comprising an alkoxide of one of the elements Sr, Ba, and Nb in an alcoholic solvent.

23. A method as set forth in claim 21 wherein the alcoholic solvent comprises methoxyethanol.

24. A method as set forth in claim 21 wherein the Sr, Ba, and Nb alkoxides is maintained at a temperature ranging from about −30 to about 25° C. prior to mixture with the gelling solution.

25. A method as set forth in claim 21 wherein the gelling solution comprises a mixture of methoxyethanol and deionized water.

26. A method as set forth in claim 21 wherein mixing of the solution Sr, Ba, and Nb alkoxides with the gelling solution is carried out at a temperature ranging from about −30 to about 25° C.

27. A method as set forth in claim 21 wherein drying of the gel is carried out at temperatures ranging from about 1 to about 25° C.

28. A method as set forth in claim 21 wherein drying of the gel is carried out over a period of time ranging from about 2 to about 21 days.

29. A method as set forth in claim 21 wherein densifying of the dried gel is accomplished by calcining the dried gel, followed by pressing and sintering.

30. A method as set forth in claim 29 wherein the dried gel is ground prior to calcining.

31. A method as set forth in claim 29 wherein calcining is carried out at a temperature ranging from about 1050 to about 1250° C., and for a time ranging from about 1 to about 3 hours.

32. A method as set forth in claim 29 wherein sintering is carried out at a temperature ranging from about 1250 to about 1480° C., and for a time ranging from about 2 to about 4 hours.

33. A method as set forth in claim 29 wherein densifying of the dried gel further includes hot isostatic pressing following sintering.

34. A polycrystalline strontium barium niobate material of the formula $Sr_xBa_{1-x}Nb_2O_6$, where x ranges from about 0.20 to about 0.80, having a substantially 100 percent tungsten bronze structure, the material produced by the method comprising the steps of:
a. forming a solution of Sr, Ba and Nb alkoxides in an alcoholic solvent;
b. mixing the solution of Sr, Ba and Nb alkoxides with a gelling solution comprising a mixture of alcohol and water to form a gel;
c. drying the gel; and
d. densifying the dried gel.

35. A material as set forth in claim 34, wherein x ranges from about 50 to about 0.75.

36. A material as set forth in claim 34 wherein x is about 0.50.

37. A material as set forth in claim 35, wherein x is about 0.60.

38. A material as set forth in claim 34 wherein x is about 0.75.

39. A material as set forth in claim 34 having a dielectric constant ranging from about 1000 to about 6000 for temperatures ranging from −50 to 150° C.

40. A material as set forth in claim 34 having a Curie temperature ranging from about 25 to about 95° C. for a frequency of 1 kHz.

* * * * *

UNITED STATES PATENT AND TRADEMARK OFFICE
CERTIFICATE OF CORRECTION

PATENT NO.   :  5,011,796
DATED        :  April 30, 1991
INVENTOR(S)  :  Keith Bridger et al It is certified that error appears in the above-identified patent and that said Letters Patent is hereby corrected as shown below:

On Title Page, Item 56, under "U.S. Patent Documents" add:

| | | | |
|---|---|---|---|
| 4,001,127 | 1/1977 | Megumi et al | 252/62.9 |
| 4,019,915 | 4/1977 | Miyauchi et al | 106/73.31 |
| 4,187,109 | 2/1980 | Megumi et al | 430/2 | and under "Other Publications" add:

"The Relation Between Structure and Ferroelectricity in Lead Barium and Barium Strontium Niobates", M.H. Francombe, Acta Crystallography (1960) 13, 131.

"The Growth and Properties of Strontium Barium Metaniobate, $Sr_{1-x}Ba_xNb_2O_6$, A Tungsten Bronze Ferroelectric", A.A. Ballman and H.Brown, Journal of Crystal Growth 1 (1967) 311-314.

"Unique Properties of SBN and Their Use in a Layered Optical Memory", J.B. Thaxter and M. Kestigian, Applied Optics, Vol. 13, No. 4, April 1974, pp. 913-924.

"Epitaxial Growth of Ferroelectric T.B. $Sr_{1-x}Ba_xNb_2O_6$ Films for Optoelectronic Applications", R.R. Neurgaonkar and E.T. Wu, Materials Research Bulletin, Vol. 22, pp. 1095-1102, 1987.

"Phase Equilibria Relations in the Ternary System $BaO-SrO-Nb_2O_5$", J.R. Carruthers and M. Grasso, Journal of the Electrochemical Society: SOLD STATE SCIENCE, Vol. 117, No. 11, pp. 1426-1430, 1970.

"Synthesis Study of Superconducting $YBa_2Cu_3O_{7-x}$ Powders from Metal-Alkoxides", K. Wu, S. Kramer and G. Kordas, Materials Research Society Symposium Proceedings, Vol. 99, pp. 395-397, 1988.

UNITED STATES PATENT AND TRADEMARK OFFICE
CERTIFICATE OF CORRECTION

PATENT NO. : 5,011,796

DATED : April 30, 1991

INVENTOR(S) : Keith Bridger, et al

It is certified that error appears in the above-identified patent and that said Letters Patent is hereby corrected as shown below:

Column 8, line 25, "50" should read --0.50--.

Signed and Sealed this

First Day of December, 1992

*Attest:*

DOUGLAS B. COMER

*Attesting Officer*    *Acting Commissioner of Patents and Trademarks*